United States Patent

Gregg et al.

[15] 3,673,513
[45] June 27, 1972

[54] ELECTRON BEAM-INITIATED CHEMICAL LASER SYSTEMS

[72] Inventors: David W. Gregg, Lafayette; Ray E. Kidder, Pleasanton; Barton Krawetz, Livermore, all of Calif.

[73] Assignee: The United States of America as represented by the United States Atomic Energy Commission

[22] Filed: May 26, 1970

[21] Appl. No.: 40,652

[52] U.S. Cl. ............................................331/94.5, 330/4.3
[51] Int. Cl. ..........................................H01s 3/22, H01s 3/09
[58] Field of Search....................................331/94.5; 330/4.3

[56] References Cited

UNITED STATES PATENTS 3,321,714  5/1967  Tien........................................331/94.5
3,493,886  2/1970  Coffee....................................331/94.5

OTHER PUBLICATIONS

Glockler, J. of Physical & Colloid Chem., Vol. 52, 1948, pp. 451–456

Kompa et al., J. Chem. Phys., Vol. 47, 1967, pp. 857–8
Andriakhin et al., J.E.T.P. PIS. RED., Vol. 8, No. 7, Oct. 1968, pp. 12
Hart, " Radiation Chemistry, Vol. II.," Advances in Chemistry Series 82, Am. Chem. Soc. Wash., D.C., 1968 pp. 212–221

*Primary Examiner*—Ronald L. Wibert
*Assistant Examiner*—Robert J. Webster
*Attorney*—Roland A. Anderson

[57] ABSTRACT

An electron beam-initiated volumetrically ignited chemical laser system wherein a short, high energy charged particle pulse directed through an explosive gaseous mixture within an optical cavity uniformly ignites the explosive mixture in the optical cavity. The energy released in the conflagration creates a large population inversion in lasing energy states of transient and resulting chemical species. Volumetric ignition is distinguished from point ignition in that with point ignition a large volume of material is consumed via the propagation of a macroscopic burn or slow front whereas no such macroscopic front occurs for volumetric ignition. The electron beam provides a means to obtain "multipoint" ignition throughout the volume of material.

12 Claims, 1 Drawing Figure

PATENTED JUN 27 1972
3,673,513
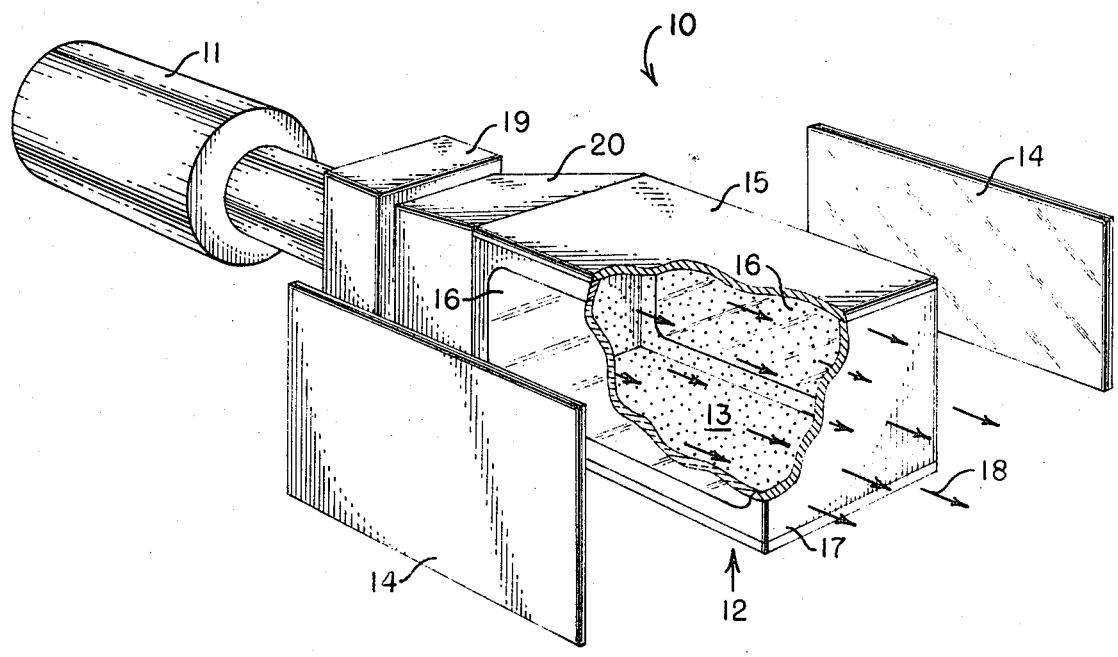
INVENTORS
DAVID W. GREGG
RAY E. KIDDER
BARTON KRAWETZ
BY
ATTORNEY:

ELECTRON BEAM-INITIATED CHEMICAL LASER SYSTEMS

BACKGROUND OF THE INVENTION

The invention described herein was made in the course of, or under, Contract No. W-7405-Eng-48 with the United States Atomic Energy Commission.

This invention relates to gas explosion laser systems and more particularly to an electron beam-initiated gas explosion or chemical laser system.

While gas explosion or chemical laser systems using, for example, the reaction of molecular hydrogen and atomic fluorine, are known in the prior art, high power pulsed chemical lasers have not been considered practical for a variety of reasons. The primary objections to the prior known chemical lasing systems are briefly: (1) slow pulse rise time, (2) long time width of the generated pulse, and (3) nonuniformity of fast exothermic chemical reactions thereby generating shock waves.

SUMMARY OF THE INVENTION

The present invention overcomes at least part of the above-mentioned objections to the prior art chemical or gas explosion laser systems by providing an electron beam-initiated volumetrically ignited chemical explosion gas laser system which has a fast pulse rise time; uniformly ignites a volume of an explosive, gaseous mixture; and has a substantially shorter timewidth than the prior art means for initiating a large volume gas explosion.

Therefore, it is an object of the invention to provide an electron beam-initiated volumetrically ignited chemical laser system.

A further object of the invention is to provide an electron beam-initiated volumetrically ignited chemical laser system capable of uniformly igniting a volume of an explosive, gaseous mixture which produces excited hydrogen fluoride exhibiting gain and lasing action.

Another object of the invention is to provide an electron beam-initiated volumetrically ignited chemical laser system having a short time width of the generated pulse.

Another object of the invention is to provide an electron beam-initiated volumetrically ignited chemical laser system having a fast pulse rise time.

Other objects of the invention not specifically set forth will become readily apparent to those skilled in the art from the following description and accompanying drawing.

BRIEF DESCRIPTION OF THE DRAWING

The single FIGURE illustrates an embodiment of the inventive electron beam-initiated chemical laser system in an oscillator configuration.

DESCRIPTION OF THE INVENTION

The inventive electron beam-initiated volumetrically ignited explosive gas or chemical laser system, as illustrated in the drawing in an oscillator configuration, is generally indicated at 10 and basically includes a pulsed electron beam generator 11 such as an accelerator, containment vessel or housing 12 containing an explosive gaseous mixture or medium 13, and a pair of mirrors 14. The vessel or housing 12 is formed of a first pair of sidewalls 15 (only one shown) opaque or transparent to light, constructed from metal if opaque or sodium chloride if transparent, for example; a second pair of sidewalls 16 transparent to light, constructed from sodium chloride for example; and a pair of endwalls 17 (only one shown) transparent to high energy electrons, constructed, for example, from any metal foil, such as aluminum, capable of withstanding the environment of the vessel 12. The explosive gaseous mixture or medium 13 is, for example, selected from certain families of chemical mixtures which, when illuminated by an electron beam, in an exothermic reaction produces excited chemical species which will exhibit gain and lasing action. Reactions of mixtures of gaseous chemical species which generate excited hydrogen fluoride is an example of such a family of a gaseous reaction system. Since specific reactions of mixtures of gaseous chemical species do not constitute part of this invention such has not been described in detail. However, such chemical species are described and claimed in copending U.S. patent application Ser. No. 40,653, filed May 26, 1970 by David W. Gregg et al., and assigned to the same assignee.

One of the mirrors 14, for example, has about 100 percent reflectivity capability, while the other of mirrors 14 is adjustable in reflectivity to give maximum laser output. The mirrors 14 are positioned on each side of vessel 12 and spaced from sidewalls 16 and define an optical cavity within vessel 12. If desired, the mirrors 14 may be placed within the vessel integral with the vessel walls, or external to but in abutment with the vessel. The vessel 12 is placed in an electron beam path from accelerator 11 as indicated by the arrows 18. A conventional means 19, such as a beam manipulation or dispersing device using magnetic fields or scattering films, is shown positioned between accelerator 11 and vessel 12 to disperse the electron beam 18 such that it has the same cross sectional area as the vessel 12. Device 19 is connected to vessel 12 via a tapered portion 20 which serves to assist in the manipulating or dispersing of the beam 18 to the vessel cross-section configuration. It should be noted that the beam manipulation device 19 may be eliminated, depending on the desired electron beam configuration and/or the direction of the beam with respect to the light beam.

In operation, the electron beam accelerator 11 directs a high energy electron beam pulse 18 through the contained explosive gaseous mixture 13 in the optical cavity of vessel 12 defined by mirrors 14. The electron beam pulse 18 uniformly ignites the explosive gaseous mixture 13. Excited chemical species are created in the explosion which have a lasing capability. The short timewidth of initiating electron pulse and the uniformity of the initiation creates a population inversion in the energy states of the lasing free radical chemical species. For a specific example of the parameters of such as laser system, reference is made to the above-identified copending U. S. Patent application Serial No. 40,653.

Alternately, an inert gas, such as carbon dioxide can be included in the explosive gas mixture, whereby the excited species existing during the explosion transfer energy to the inert gas, thereby generating a population inversion suitable for lasing.

It has thus been shown that the present invention provides an electron beam-initiated chemical gas explosion laser system which substantially differs from prior art gas explosion laser systems in that the electron beam uniformly ignites a volume of an explosive, gaseous mixture and has a substantially shorter timewidth, thereby substantially advancing the state of the art of chemical gas explosion laser systems.

While the invention has been illustrated in an oscillator configuration, it will function equally as well in an amplifier configuration by: removing the mirror, providing a light path through the transparent walls and lasing medium, so that when gain appears, an external oscillator pulse can be amplified by passage through this high-gain medium.

Also, while the conventional means have not been shown to extract light from the oscillator configuration shown, the positioning of beam splitters or the use of proper reflectivity characteristic mirrors, as well known in the art, can be used.

While the electron beam 18 is illustrated as being in a direction substantially perpendicular with respect to light beam between the mirrors 14, the direction, if desired, of the electron beam may vary with respect to the light beam from perpendicular to parallel, depending on the application and the construction of the apparatus utilized.

Also, while the lasing medium or mixture 13 is illustrated as being contained or within vessel or housing 12, it is not intended to limit the concept to the use of a closed containment vessel, since vessel 12 can be open at one or both ends under conditions where the lasing medium is at ambient pressure, such as in high altitude operations such that the lasing medium 13 passes through the optical cavity formed by vessel 12 and mirrors 14.

Although a particular embodiment and particular lasing material have been described and/or illustrated, modifications will become apparent to those skilled in the art, and it is intended to cover in the appended claims all such modifications as come within the spirit and scope of the invention.

What we claim is:

1. An electron beam-initiated volumetrically ignited chemical gas explosion laser system comprising: means defining an optical resonant cavity; a containment vessel means located within said resonant cavity; an explosive gaseous lasing medium within said containment vessel means; electron beam generating means for producing short high energy electron pulses for causing multipoint uniform, non-propagational ignition of said explosive gaseous lasing medium, said electronic beam generating means being operatively connected to said containment vessel means for directing beams of said short high energy electron pulses through said explosive gaseous lasing medium contained in said containment vessel means, such that a beam of electrons from said generating means passing through said explosive gaseous medium, causing multipoint, uniform and non-propagational ignition of the explosive gaseous medium producing excited chemical species having a lasing capability by creating a large population inversion in the energy states of the lasing chemical species.

2. The laser system defined in claim 1, wherein said containment vessel means is formed of a first pair of oppositely positioned sidewalls, a second pair of oppositely positioned sidewalls transparent to light, and a pair of oppositely positioned endwalls transparent to high energy electrons.

3. The laser system defined in claim 2, wherein said resonant cavity comprises a pair of mirrors, one of said mirrors having a reflectivity characteristic of about 100 percent, and the other of said mirrors being adjustable in reflectivity to give maximum laser output.

4. The laser system defined in claim 2, wherein said first pair of oppositely positioned sidewalls is transparent to light.

5. The laser system defined in claim 2, wherein said first and second pairs of oppositely positioned sidewalls are constructed from sodium chloride and said pair of endwalls is constructed from aluminum.

6. The laser system defined in claim 1, additionally including electron beam dispersing means operatively connected between said electron beam generating means and said optical cavity for dispersing the electron pulses from said electron beam generating means to conform substantially with the cross-sectional area of said optical cavity.

7. The laser system defined in claim 1, wherein said explosive gaseous medium consists essentially of a chemical mixture which, when illuminated by an electron beam, in an exothermic reaction produces excited hydrogen fluoride which exhibits gain and lasing action.

8. An electron beam-initiated volumetrically ignited chemical gas explosive laser system comprising: means defining a containment vessel; an explosive gaseous lasing medium within said containment vessel; electron beam generating means for producing short high energy electron pulses for causing multipoint, uniform, non-propagational ignition of said explosive gaseous lasing medium, said electron beam generating means being operatively connected to said containment vessel for directing beams of said short high energy electron pulses through said explosive gaseous lasing medium in said containment vessel; said containment vessel including a first pair of oppositely positioned wall surfaces having at least a portion thereof transparent to light, and a second pair of oppositely positioned wall surfaces transparent to high energy electrons; and means providing a light path through said first pair of wall surfaces and said lasing medium; such that beams of electrons from said generating means passing through said explosive gaseous lasing medium, causes multipoint, uniform and non-propagational ignition of the explosive gaseous medium producing a high-gain medium of excited chemical species by creating a large population inversion in the energy states of the chemical species for amplifying light passing through said first pair of transparent wall surfaces of said containment vessel.

9. The system defined in claim 8, wherein said first pair of oppositely positioned wall surfaces define a first pair of sidewalls, wherein said second pair of oppositely positioned wall surfaces define a pair of endwalls, and wherein said containment vessel includes a third pair of oppositely positioned wall surfaces defining a second pair of sidewalls, said first and second pairs of sidewalls and said pair of endwalls being interconnected.

10. The system defined in claim 9, wherein said first pair of sidewalls include at least a portion thereof constructed from sodium chloride, and said pair of endwalls is constructed from aluminum.

11. The system defined in claim 8, additionally including electron beam dispersing means operatively connected between said electron beam generating means and said containment vessel for dispersing the electron pulses from said generating means to conform substantially with the cross-sectional area of said containment vessel.

12. The system defined in claim 8, wherein said explosive gaseous medium consists essentially of a chemical mixture which, when illuminated by an electron beam, in an exothermic reaction produces excited hydrogen fluoride which exhibits gain.

* * * * *